United States Patent [19]

Miller et al.

[11] 4,030,997

[45] June 21, 1977

[54] METHOD OF ALIGNING LIQUID CRYSTALS

[75] Inventors: Leroy J. Miller, Canoga Park; Jan Grinberg, Los Angeles, both of Calif.

[73] Assignee: Hughes Aircraft Company, Culver City, Calif.

[22] Filed: Apr. 21, 1975

[21] Appl. No.: 570,304

[52] U.S. Cl. .................. 204/192 E; 204/192 EC; 427/35; 427/38; 427/126; 427/331; 427/344; 427/352; 428/1; 350/160 LC
[51] Int. Cl.² .................. G02F 1/16; C23C 15/00
[58] Field of Search .............. 428/1; 350/160 LC; 427/126, 35, 38, 331, 344; 204/192 EC, 192 E

[56] References Cited

UNITED STATES PATENTS

| 3,687,515 | 8/1972 | Haas et al. | 350/160 LC |
| 3,700,306 | 10/1972 | Cartmell et al. | 350/160 LC |
| 3,809,456 | 5/1974 | Goldmacher et al. | 350/160 LC |
| 3,843,233 | 10/1974 | Haas et al. | 350/160 LC |
| 3,853,391 | 12/1974 | Sorkin | 428/1 |
| 3,854,793 | 12/1974 | Kahn | 350/160 LC |

OTHER PUBLICATIONS

Dixon et al., Alignment Mechanism . . . Layers, Appl. Phys. Let., vol. 24 (No. 2), pp. 47–49, (Jan. 1974).
Urbach et al., Alignment . . . Films, Appl. Phys. Letters, vol. 25 (No. 9), pp. 479–481, (Nov. 1974).

*Primary Examiner*—Michael F. Esposito
*Attorney, Agent, or Firm*—B. T. Hogan, Jr.; W. H. MacAllister

[57] ABSTRACT

A method of aligning nematic liquid crystals with their directors in a tilted configuration is disclosed.

8 Claims, No Drawings

METHOD OF ALIGNING LIQUID CRYSTALS

RELATED APPLICATIONS

In U.S. application Ser. No. 570,302 filed Apr. 21, 1975 by applicant herein and others, a technique for inducing uniform tilted alignment or perpendicular alignment in a liquid crystal cell is disclosed. This invention differs from that of application Ser. No. 570,302 in that the chemical aligning agents employing belong to an entirely different class of components. In U.S. application Ser. No. 570,305 filed Apr. 21, 1975, by applicant herein and another, a method of aligning liquid crystals on coated substrates such that these directors are perpendicular to the surface is disclosed. Applicant also discloses a method of aligning liquid crystals such that their directors are perpendicular to the surface of uncoated substrates in U.S. application Ser. No. 570,306, filed Apr. 21, 1975.

BACKGROUND OF THE INVENTION

1. Field of the Invention

This invention is related to the field of electro-optical systems in general and to the use of liquid crystals in electro-optical systems in particular.

2. Description of Prior Art

The utilization of nematic liquid crystals in the fabrication of electro-optical devices has been well established. For certain applications, it is desirable to orientate the directors of these crystals such that they assume a tilted alignment with respect to the surface of a substrate. Such an alignment is necessary for the television projection display and color symbology light values made by Hughes Aircraft Company.

In general, a tilted alignment is desirable if, an electric field is applied across the liquid crystal normal to the surfaces, and if the liquid crystal has a negative dielectric anisotropy so that the molecules are tilted towards a parallel position.

Prior art processes for aligning liquid crystals involved the use of either soluble ionic alignment agents or polymeric surface coatings.

Ionic aligning agents included tetralkylammonium salts (U.S. Pat. No. 3,656,834 by I. Haller et al. dated Apr. 18, 1972), barium stearate (I. Haller, Appl. Phys. Lett. 24, 349[1974]), or lecithin (F. K. Kahn et al., Proc. IEEE 61, 823[1973]).

The use of polymeric silicone coatings to align liquid crystals has been reported by Kahn, et al., lic. cit. as has the use of a plasma-polymerized film (J. C. Dubois et al. Appl. Phys. Lett. 24, 297[1974]).

A soluble polyamide has also been used to align liquid crystals (W. Haas, et al., Phys. Rev. Lett. 25, 1326[1970]).

Each of the alignment process disclosed above has been shown to yield orientated liquid crystals with some significant limitations. In the case of ionic alignment agents, the undesirable characteristic is the conductivity of the resulting mixture. Devices fabricated from liquid crystals orientated via a polymeric aligning agent exhibit slow response times and poor alignment stability.

THE INVENTION

Summary

A means of aligning nematic liquid crystals with their directors almost perpendicular to the surface of a substrate, but with a slight, uniform tilt away from perpendicular is disclosed. This invention provides a surface on which the liquid crystals will spontaneously assume the tilted perpendicular alignment upon being placed in contact.

The method consists of (1) overcoating the surface of an electro-optic device or electrode with a thin layer of SiO, or a material such as SiO which has reactive surface hydroxyl groups; (2) ion beam etching the surface at a shallow angle; (3) treating the surface with a mixture of a long chain aliphatic alcohol and an amine; (4) washing the surface with an organic solvent and (5) using the treated surface to construct a device in which the liquid crystal is in contact with the surface.

The most advantageous feature of the invention is that it enables one to control the tilt angle precisely and reproducibly.

Detailed Description

In most liquid crystal devices it is necessary to have the liquid crystal molecules aligned in a specific orientation so that they will respond in a predictable manner when a field is applied.

It is an object of this invention to provide a means of achieving an alignment of liquid crystal directors on the surface of a substrate such that the directors are slightly tilted from the perpendicular.

A further object of this invention is to achieve a tilted alignment of the directors of liquid crystals one surface of a substrate without altering the electrical or optical characteristics of the liquid crystals.

In addition, it is an object of this invention to achieve the first two objectives with precision and reproducibility.

This invention solves this problem where the desired orientation calls for a tilted alignment such as in the case of television projection displays and color symbology light valves.

Generally alignment is achieved by controlling the boundary conditions at the surfaces in contact with the liquid crystal. In some devices it is necessary that the molecules be aligned with their long molecular axes perpendicular or almost perpendicular to the surfaces in the absence of a field. They must also respond to an electric field by tilting uniformly in a single direction away from the perpendicular towards a parallel orientation. This invention provides a means for aligning a nematic liquid crystal so that it can respond in this manner. The method aligns the molecules almost perpendicular to the surface but reproducibly causes them to be slightly tilted in a single direction in the absence of a field. Therefore, when a field is applied, the molecules are tilted further in the same direction. The invention also provides a means of controlling the angle of tilt in the off-state alignment. The most advantageous feature of the invention is that it enables one to control the tilt angle precisely and reproducibly.

Specifically, the control of alignment in the absence of an electrical field is entirely the result of interactions between the liquid crystals and the surface of the substrate. In order to control these interractions, we apply a thin coating of silica over the substrate surface. Such a coating can be applied, for example, by sputtering $SiO_2$ with a radio frequency plasma using an argon atmosphere while the surface being coated is at ground potential. Materials other than $SiO_2$ can be used if (1) shallow angle ion beam etching induces homogeneous parallel alignment of a insert crystal and if (2) surface hydroxyl groups are present and react with an alcohol. Silica is used in this disclosure as an example.

The SiO₂ surface is then ion beam etched with argon ions in an apparatus such as the Veeco Microetch. The ion beam should form an angle of less than 40° with the surface, and preferably the angle should be from 10° to 30°. This treatment modifies the surface in a manner that has not yet been determined in detail, but we believe it creates submicroscopic depressions or cavities in the surface. The shape of these surface features is instrumental in providing directionality to the alignment of the liquid crystal. If the liquid crystal is applied directly to such a surface, however, the liquid crystal molecules will align parallel or almost parallel to the surface. This has been disclosed by Little, Garvin, and Lee.

To obtain a tilted perpendicular alignment, the surfaces are then treated with a mixture of an alcohol and an amine. Suitable alcohols have the following formula:

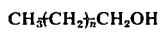

where $n \geq 10$. Shorter chain alcohols may be useful in some mixtures, or for certain unusual liquid crystal mixtures, or for obtaining very high tilt angles, but in general the alcohols with 10 or more carbons suffice for obtaining a tilt angle of 10° or less, which is sufficient for most practical applications. Alcohols with 18 or more carbon atoms also tend to produce very small tilt angles, and these are less desirable except for unusual liquid crystal mixtures or unusual applications. They are useful, however, if a truly perpendicular alignment is desired, as described in U.S. application Ser. No. 570,305.

Any aliphatic amine is satisfactory for this invention, as long as it does not contain groups that would tend to depress the basicity of the amine. Primary amines are preferred and, as a practical matter, we prefer amines that have a low volatility at the temperature at which the treatment is carried out. Satisfactory amines include 1-octadecylamine, 1-hexadecylamine, 1-tetradecylamine, 1-dodecylamine, didodecylamine, tridodecylamine, N-methyloctadecylamine, N,N-dimethyloctadecylamine, and the like.

It is convenient to use a mixture of the alcohol and the amine without any solvent or unreactive diluents, although the use of such solvents or diluents is not excluded. Obviously, the reaction can proceed more rapidly if no solvents or diluents are used. The ratio of alcohol to amine is not critical. Since the reaction probably involves one molecule of alcohol and one molecule of amine in bringing about a change at one surface site, we have preferred to use approximately equal molar quantities of alcohol and amine. If the molecular weights are not very much different, it is simple to use equal amounts by weight. An aligning effect using aliphatic alcohol, having the formula $CH_3(CH_2)_nCH_2OH$ where $n$ is equal to or greater than 3, has been observed when no amine was used, but this effect was marginal, and we prefer using substantial quantities of amine.

The treatment is believed to cause a reaction between the alcohol and hydroxyl groups on the silica surface, with the amine performing the function of a catalyst for this reaction. This can be depicted by the following equation:

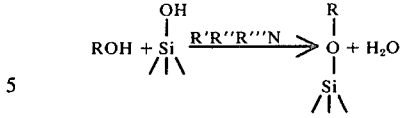

In this equation the silicon atom is part of the silica surface and is attached to other atoms in the silica coating.

A temperature of 60° C or higher may be used to bring about some reaction with the surface, but the treatment is marginally effective at 60° C. Temperatures above 100° C are preferred, probably because water, which is shown as a byproduct in the above equation, is vaporized and driven from the alcohol-amine mixture. The upper temperature range is not important, except that it must not be so high that there is extensive thermal decomposition or oxidation of the organic components of the mixture. Temperatures in the range of 100° to 150° C are adequate. If the treatment is carried out in an open container, a practical upper temperature limit is the boiling point of the mixture. Normally it is not necessary to exclude air, although such exclusion will retard oxidation of the organic components.

We have observed an aligning effect with a substrate that had been in the hot alcohol-amine mixture for only 15 minutes at 60° C. However, we prefer to carry out the alcohol-amine treatment under conditions that assure virtually complete reaction of the reactive surface sites. Therefore, we prefer to use temperatures in excess of 100° C and periods of more than 4 hours. Typically, we carry out this treatment at 120° C for 12 to 24 hours. Virtually complete reaction is desired if the tilt angle is to be controlled reproducibly. Obviously, the time required to complete the reaction to the desired extent is a function of the temperature and the concentration of the alcohol and of the amine.

The treated substrate can be washed with any common inert organic solvent that dissolves the alcohol and the amine. Generally, we have used a hydrocarbon solvent, such as hexane, as the primary solvent. An alcohol solvent, such as methanol or ethanol, aids in the removal of excess alcohol and amine. Other solvents, such as ketone solvents, aromatic solvents, chlorinated hycrocarbon solvents, and the like, may also be used.

We have found that when we make a liquid crystal cell by combining two surfaces treated as described with a thin layer of liquid crystal between them, the liquid crystal will have the tilted perpendicular alignment throughout the cell. It is necessary, however, that the surfaces be ion beam etched in opposite directions. This is illustrated in FIG. 1.

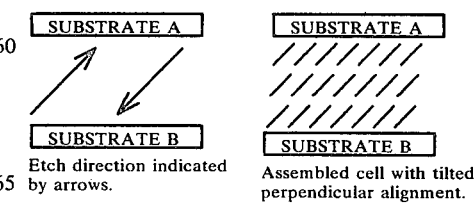

Figure 1 Correct Assembly Method.

Etch direction indicated by arrows.

Assembled cell with tilted perpendicular alignment.

If the cell is assembled with the surfaces etched in the same direction, the uniform tilt is not present throughout the cell. The wrong method of assembly is shown in FIG. 2.

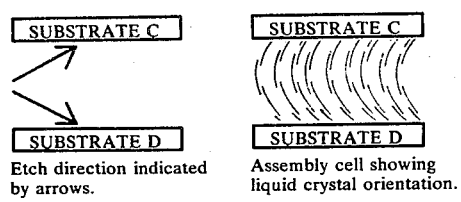

Figure 2. Incorrect Assembly Method.

Etch direction indicated by arrows.

Assembly cell showing liquid crystal orientation.

When an electric field is applied across the liquid crystal in FIG. 1, the molecules will all tilt in the same direction. When an electric field is applied across the liquid crystal in FIG. 2, there will be a tendency for the liquid crystal at one surface to tilt in one direction, while there is a tendency to tilt in the opposite direction at the other surface. In practice, the liquid crystal will tilt in various direction, with twisting in the bulk to accommodate for the differences.

The angle of tilt away from perpendicular, which is defined as $\theta$ in the sketch in FIG. 3, is an important characteristic in some liquid crystal devices.

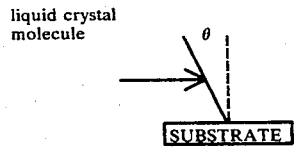

FIG. 3

The tilt angle will affect such properties as: (1) the transmission of light through a device consisting of the cell sandwiched between crossed polarizers, particularly when the planes of polarization passed by each polarizer form an angle of 45° with the tilt direction; (2) the sharpness of the response curves as the voltage is increased up to and through the threshold voltage; (3) the response time; and (4) the ability to resist tilting in the opposite direction at th edges of an applied field, where there are lateral components to the field.

Using the above observations as qualitative criteria for determining changes in the tilt angle, we have found that for a given liquid crystal composition the tilt angle increases as the carbon chain length of the alcohol used in the alcohol-amine treatment is decreased. For a given alcohol-amine treatment, the tilt angle depends on the composition of the liquid crystal or liquid crystal mixture, including dopants. We believe that the orientation of the liquid crystal at the surface is a function of both the surface tension of the liquid crystal ($\gamma_L$) and the critical surface tension of the solid ($\gamma_C$), as discussed by Kahn, Taylor and Schonhorn [loc. cit.]. However, instead of simply orienting either parallel or perpendicular to the surface, tilted orientations are also possible over a narrow range of values of $\gamma_C$ for a given value of $\gamma_L$. Changing the length of the alkoxy groups attached to the surface is a way of making subtle changes in $\gamma_C$, and consequently one can make subtle changes in the tilt angle. Conversely, for a given value of $\gamma_C$ one can make subtle changes in the tilt angle by making small changes in the composition of the liquid crystal. The composition of the liquid crystal is not material to this invention, but the liquid crystal composition and the surface treatment must be matched to obtain the desired tilt angle.

We have attempted to measure the tilt angle of nematic liquid crystals in a tilted perpendicular alignment. This measurement was made by determining the light transmission through a pair of crossed polarizers with the transparent liquid crystal cell between them. The arrangement is sketched in FIG. 4.

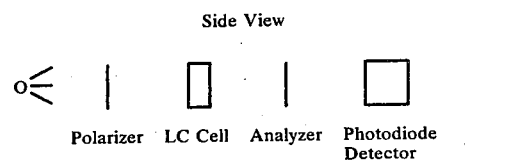

FIG. 4

The cell is then rotated so that the tilted molecules lie in planes perpendicular to the axis of rotation. Theoretically, when the light passes through the cell parallel to the optical axis (which is the same as the molecular axis), the transitted light is at a minimum. By measuring the angle of cell rotation to reach this minimum, one can determine the tilt angle. Because of the difference between the refractive index of the liquid crystal and that of air, the tilt angle is about two-thirds of the angle of cell rotation.

The data obtained by these measurements agree with our qualitative observations, when allowance is made for experimental error. As the chain length of the alcohol is decreased, the tilt angle increases. The following examples are provided to illustrate the practice of this invention.

EXAMPLE 1

A photoconductive electrode and a counter electrode for a liquid crystal light valve were overcoated with a thin ( 2700 A) of $SiO_2$ by sputtering in a radio frequency plasma. The electrodes were at ground potential during sputtering, and an argon atmosphere was used. The resulting $SiO_2$ surfaces were ion beam etched in a Veeco Microetch, with the angle formed by the beam and the surfaces being 20°. These electrodes were used to make a light valve, first without treating the surfaces with an alcohol and an amine, and subsequently after an alcohol-amine treatment.

When the light valve was first made, a liquid crystal mixture consisting of four phenyl benzoate esters was used, and the mixture was saturated with hexadecyltrimethylammonium stearate, a perpendicular aligning agent. The electrodes were kept apart by a 2 $\mu$ thick $SiO_2$ spacer at the periphery of the counter electrode. When the light valve was first operated with crossed polarizers in the projection beam, it was apparent that only half of the cell was aligned approximately perpendicular (homeotropic alignment) and the rest was aligned approximately parallel (homogeneous alignment). Durng first few minutes of operation the area aligned perpendicular shrank in size and soon the whole cell was permanently aligned parallel. The aligning agent was ineffective in this thin cell.

The cell was taken apart and the electrodes were washed with hexane and methanol to remove the liquid crystal. They were then heated about 18 hours at 120° C in a 1:1 mixture by weight of 1-hexadecanol and 1-hexadecylamine. After the treatment, the unreacted alcohol and amine were removed by thoroughly washing with hexane and with methanol again. The cell was then reassembled using a liquid crystal mixture similar to that previously used, but only half saturated with the hexadecyltrimethyl-ammonium stearate. The stearate served as a conductive dopant although it was ineffective as an aligning agent in this case. During operation of the cell we found the liquid crystal to be well aligned in an orientation that was virtually indistinguishable from perpendicular (homeotropic) alignment. However, the liquid crystal molecules all tilted in the same direction when an electric field was applied, indicating that a tilted perpendicular alignment was present. No alignment change occurred during several hours of operation of the light valve.

EXAMPLE 2

A light valve was constructed similar to that of Example 1, including the alcohol-amine treatment. The electrodes were put together in such a way that the ion beam etching was in the same direction on both surfaces. When the cell was operated with crossed polarizers in the projection beam, black lines ran through the projected images on the screen. These black lines corresponded to places in the light valve where the tilt of the liquid crystal was parallel to the plane of polarization of either the polarizer or the analyzer. They indicated that the liquid crystal was tilting in various directions in the applied field. The cell was taken apart and reassembled with one electrode turned end for end, so that the etching on the two surfaces was not in opposite directions. No black lines ran through the image areas now, and the characters were uniform in appearance where the electric field was of uniform strength. This indicated that the molecules were now tilted in a uniform direction by the field, and that therefore the tilt was uniform in direction in the off state.

EXAMPLE 3

Pieces of glass plate coated with indium-tin oxide ("Nesatron," available from PPG) were cleaned in an isopropyl alcohol degreaser, etched in chromic acid, and washed with water and with transene. The cleaned indium-tin oxide surfaces were overcoated with SiO and ion beam etched at a shallow angle as described in Example 1. These samples were then heated in 1:1 mixtures by weight of a primary alcohol and 1-hexadecyl-amine at 125° ± 10° C for 17 hours. The treated surfaces were washed throughly with hexane and methanol. Transparent cells were constructed using a ½ mil thick Mylar spacer and a four-component ester liquid crystal mixture (HRL-2N10). The tilt angle was then determined with apparatus such as that described in FIG. 4. Tabulated below are the alcohols used and the results obtained about 10 weeks after the cells were made.

| Alcohol | Tilt Angle, |
|---|---|
| 1-octadecanol | 0.2 |
| 1-hexadecanol | 0.5 |
| 1-tetradecanol | 0.3 |
| 1-dodecanol | 3.7 |
| 1-decanol | 6.5 |

The trend toward larger tilt angles with shorter alcohols is clear. Experimental error is estimated to be about 0.2°.

EXAMPLE 4

This example illustrates that an alcohol-amine treatment which produces a satisfactory tilt for one liquid crystal mixture may produce too much tilt in a different mixture.

An $SiO_2$-overcoated photosensitive light valve substrate and an $SiO_2$-overcoated counter electrode were shallow angle ion beam etched as described in Example 1. They were treated for 19 hours at 115° to 125° C in a 1:1 mixture of 1-tetradecanol and 1-hexadecylamine, then washed thoroughly with organic solvents to remove unreacted alcohol and amine. The counter electrode had a $2\mu$ thick $SiO_2$ spacer at the periphery.

A cell was first constructed using a mixture of six phenyl benzoate esters (HRL-2N13). The light valve had good contrast when the image was projected with crossed polarizers. The cell was taken apart, and the electrodes were washed with organic solvents to remove the liquid crystal. The electrodes were then reused to make a light valve with another liquid crystal mixture (HRL-2N12), which differed from HRL-2N13 only in that it lacked one of the six esters. A low contrast was now obtained because the system transmitted too much light in the off state. Also, the threshold in the transmission vs. voltage curve was less sharp. These characteristics were attributed to too much tilt in the alignment of the liquid crystal. Again the cell was disassembled and washed, and the electrodes were reused to make a light valve with HRL-2N13. A high contrast was again obtained, demonstrating that there was no change in alignment due to the techniques of taking apart the cell, washing the electrodes, and reassembling the cell.

EXAMPLE 5

This example illustrates the use of mixtures to obtain the right degree of tilt in the alignment.

Three similar $SiO_2$-overcoated photosensitive light valve substrates and counter electrodes were shallow angle ion beam etched as described in Example 1 and treated with mixtures of alcohols and 1-hexadecylamine, with the amine comprising half of the weight of the mixture in each case. The treatments were for 16 to 21 hours at 117° to, 136°. Cells were constructed using as the liquid crystal a 2:1 mixture by weight of N-(p-ethoxybenzylidene)-p-butylaniline (EBBA) and N-(p-methoxybenzylidene)-p-butylaniline (MBBA) with 0.05% by weight of tetrabutylammonium perchlorate added. (This liquid crystal will align parallel on similar surfaces that do not receive the alcohol-amine treatment.) The cells were operated with crossed polarizers in the image projection beam. The images were compared for "black line edge effects," which are caused by tilting in the opposite direction at the edge of a character formed by an applied field. These black line edge effects are probably due to lateral components of the electric field. The results were:

| Alcohol Mixture | Black Line Effects | Conclusion Regarding Tilt in Alignment |
|---|---|---|
| 100% 1-tetradecanol | Strongly pronounced effect | Too little tilt |
| 60% 1-tetradecanol, 40% 1-dodecanol | very slight effect | Almost enough tilt |

-continued

| Alcohol Mixture | Black Line Effects | Conclusion Regarding Tilt in Alignment |
| --- | --- | --- |
| 30% 1-tetradecanol, 70% 1-dedecanol | No edge effect | Enough tilt |

EXAMPLE 6

Transparent SiO$_2$-overcoated electrodes similar to those described in Example 3 were heated in each of the following alcohol-amine mixtures and used to prepare liquid crystal cells with N-(p-methoxybenzylidine)-p-n-butylaniline containing 0.05% by weight tetrabutylammonium perchlorate:

| Cell | Alcohol (mixed with equal weight of 1-hexadecylamine | Temp., °C | Time, Hr. |
| --- | --- | --- | --- |
| A | 1-tetradecanol | 116–123 | 20 |
| B | 1-dodecanol | 116–123 | 20 |
| C | 1-decanol | 116–123 | 20 |
| D | 1-nonanol | 110–140 | 23 |
| E | 1-octanol | 110–140 | 23 |
| F | 1-heptanol | 110–140 | 23 |
| G | 1-hexanol | ≈157°* | 20 |
| H | 1-pentanol | ≈138°* | 20 |
| I | 1-butanol | ≈118°* | 18 |

*reflux temperature of mixture

Cells A through G exhibited measured tilt angles of 0.5° or less. Cell H exhibited a tilt angle of 6.4°, and Cell I exhibited a poorly aligned tilt angle greater than 6.4°.

Having completely disclosed our invention in terms sufficient to enable those skilled in the art to utilize it, the scope of our claims may be understood as follows:

What we claim is:

1. A method of achieving an alignment of liquid crystals or liquid crystalline mixtures such that their directors assume a tilt from the perpendicular of a substrate comprising the steps of:
    a. overcoating the surfaces of said substrates with a thin layer of materials taken from the group consisting of SiO and SiO$_2$,
    b. ion beam etching said overcoated surfaces at an angle less than 40°,
    c. treating said etched surfaces with a mixture of a long chain aliphatic alcohol having the formula CH$_3$(CH$_2$)$_n$CH$_2$OH where $n$ ranges from 2 to about 18 and an aliphatic amine,
    d. washing said treated surfaces with an inert organic solvent, and
    e. using said surfaces to construct a device whereby said liquid crystals will be placed in contact with said surfaces.

2. The method of claim 1 wherein said surfaces are coated with a layer of SiO$_2$.

3. The method of claim 1 wherein said surfaces are coated with a layer of indium-tin oxide and overcoated with a layer of SiO$_2$.

4. The method of claim 1 wherein said mixture is comprised of equal parts by weight of an alcohol, taken from the group whose formula is CH$_3$(CH$_2$)$_n$CH$_2$OH where $n$ is equal to or greater than 2, and a primary aliphatic amine.

5. The method of claim 4 wherein said mixture is an equal molar mixture of said alcohol and said amine.

6. The method of claim 1 wherein said surfaces are coated with a layer of SiO$_2$ and wherein said alcohol-amine mixture consists of a long chain aliphatic alcohol and a primary amine.

7. The method of claim 1 wherein said etched surface is treated with a long chain aliphatic alcohol taken from the group whose formula is CH$_3$(CH$_2$)$_n$CH$_2$OH where $n$ is equal to or greater than 3 instead of said alcohol-amine mixture.

8. the method of claim 1 wherein said mixture is comprised of a long chain aliphatic alcohol and an amine taken from the group comprised of primary amines, secondary amines and tetriary amines.

* * * * *